US012399598B1

(12) United States Patent
Haguel et al.

(10) Patent No.: US 12,399,598 B1
(45) Date of Patent: Aug. 26, 2025

(54) SYSTEM AND METHOD FOR DETECTING AN ACTIVE-SCREEN IN A PLURALITY OF SCREENS OF DIFFERENT MONITORS IN A MEDIA-FILE OF A RECORDED DESKTOP ACTIVITY, DURING PLAYBACK OF THE MEDIA-FILE

(71) Applicant: NICE LTD., Ra'anana (IL)

(72) Inventors: Tal Haguel, Petach Tikva (IL); Yaron Cohen, Modiin (IL); Anat Malin, Petach Tikva (IL); Shay Levy, Raanana (IL)

(73) Assignee: NICE LTD., Ra'anana (IL)

( * ) Notice: Subject to any disclaimer, the term of this patent is extended or adjusted under 35 U.S.C. 154(b) by 20 days.

(21) Appl. No.: 18/652,814

(22) Filed: May 2, 2024

(51) Int. Cl.
*G06F 3/04812* (2022.01)

(52) U.S. Cl.
CPC ............ *G06F 3/04812* (2013.01); *G06F 2203/04806* (2013.01)

(58) Field of Classification Search
CPC ............ G06F 3/04812; G06F 2203/04806
See application file for complete search history.

(56) References Cited

U.S. PATENT DOCUMENTS

| | | | | |
|---|---|---|---|---|
| 7,307,647 B2 * | 12/2007 | Hatori | ............. | G06F 3/0481 345/671 |
| 11,557,121 B2 * | 1/2023 | Cohen-Tidhar | ........ | G06V 20/41 |
| 2002/0075230 A1 * | 6/2002 | Okuda | ............. | G06F 3/038 345/157 |
| 2014/0247864 A1 * | 9/2014 | Stone | ............. | H04N 21/23418 375/240.02 |
| 2019/0179513 A1 * | 6/2019 | Gritzman | ............. | G06F 3/04817 |
| 2021/0334547 A1 * | 10/2021 | Cohen-Tidhar | ........ | G06V 10/82 |
| 2024/0086796 A1 * | 3/2024 | Mecayten | ...... | G06Q 10/063114 |
| 2024/0333781 A1 * | 10/2024 | Zhang | ............. | G06F 3/1454 |

* cited by examiner

*Primary Examiner* — Dmitriy Bolotin
(74) *Attorney, Agent, or Firm* — SOROKER AGMON NORDMAN RIBA

(57) ABSTRACT

A computerized-method for detecting an active-screen in screens of different-monitors in a media-file of a recorded desktop-activity, during playback of the media-file. The computerized-method may include: (i) configuring a recording-control service to create a stream-of-metadata of the desktop-activity; (ii) configuring a screen-recording-service to: a. receive a stream of video-data of the screens used during the desktop-activity; b. collect time-metadata of desktop-events from each device associated to the different-monitors; and c. store the video-data and the collected time-metadata, in a data-storage; (iii) configuring a media-playback application to: a. retrieve the collected time-metadata and the media-file; and b. operate a zoom-in module to detect the active-screen in the screens in each time-interval and to display the detected active-screen in each time-interval in an increased size in a central section of a UI, while each screen of all other screens is displayed side-by-side in a reduced-size in an upper-section of the UI.

16 Claims, 17 Drawing Sheets

200

240 — configuring a User Interface (UI) that is associated to the media-playback application to display the detected active-screen in each time-interval in an increased size in a central section of the UI, while each screen of all other screens in the plurality of screens is displayed side by side in a reduced size in an upper section of the UI, during the playback of the media-file.

Figure 2B

SYSTEM AND METHOD FOR DETECTING AN ACTIVE-SCREEN IN A PLURALITY OF SCREENS OF DIFFERENT MONITORS IN A MEDIA-FILE OF A RECORDED DESKTOP ACTIVITY, DURING PLAYBACK OF THE MEDIA-FILE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of playback of recorded media-file of desktop activity. More specifically, the present disclosure relates to detection of an active-screen in a plurality of different monitors in a media-file of a recorded desktop activity, during playback of the media-file.

BACKGROUND

Desktop activity of users may be monitored and recorded for later on playback of the media-file. The media-file may include video recording of screens of different monitors, each related to a computerized-device that the user has used during the desktop activity. To track the user activity during the playback of the media-file, an active-screen has to be identified from all the screens of the different monitors.

The majority of agents in contact centers operate desktop activity and use multiple screens while handling an interaction with a customer. The interactions are monitored and recorded, commonly, for quality purposes, e.g., by a recording-player web-application and a media-file of the recording is stored for future usage. Later on, during an evaluation of the interaction, the evaluator may use a media player application to playback the media-file of the interaction.

The media-file may include audio of the interaction and a video recording of the screens of the different monitors that the agent has used during the interaction. To track the agent performance during the interaction, the evaluator may have to identify the active-screen.

Currently, when an agent uses multiple screens during the desktop activity, later on it may be challenging for evaluators, to follow the desktop activity, during playback of the desktop activity, as the multiple screens are presented side by side and the evaluators have to constantly switch their focus between all the screens to track the active-screen.

Therefore, there is a need for a technical solution to automatically detect an active-screen, i.e., the screen in which there was a movement therein, from all the screens, in each time span, during the media-file playback.

SUMMARY

There is thus provided, in accordance with some embodiments of the present disclosure, a computerized-method for detecting an active-screen in a plurality of screens of different monitors in a media-file of a recorded desktop activity, during playback of the media-file. The recorded desktop activity may be an activity of an agent during an interaction with a customer.

Furthermore, in accordance with some embodiments of the present disclosure, The computerized-method may include: (i) configuring a recording-control service to create a stream of metadata of the interaction with the customer to be stored in an interactions metadata database; (ii) configuring the screen-recording-service to: a. receive a stream of video data of the plurality of screens of the different monitors used during the desktop activity from a desktop-screen-service that is running on each device that is associated to the different monitors; b. collect time-metadata of desktop events from each device that is associated to the different monitors, during the desktop activity; and c. store the video data as recording-segments of a media-file and the collected time-metadata during the desktop activity, in a data-storage; (iii) configuring a media-playback application to: a. retrieve the collected time-metadata and the media-file from the data-storage upon receiving a playback request of the desktop activity from an application; and b. operate a zoom-in module to detect the active-screen in the plurality of screens of the different monitors in each time-interval, during playback of the media-file; and (iv) configuring a User Interface (UI) that is associated to the media-playback application to display the detected active-screen in each time-interval in an increased size in a central section of the UI, while each screen of all other screens in the plurality of screens is displayed side by side in a reduced size in an upper section of the UI, during the playback of the media-file.

Furthermore, in accordance with some embodiments of the present disclosure, the collected interaction time-metadata may include at least one of: (i) mouse-cursor position by x-axis and y-axis values and related active monitor position by pixel values; and (ii) active application position by x-axis and y-axis values.

Furthermore, in accordance with some embodiments of the present disclosure, the desktop activity is an activity of an agent during an interaction with a customer. The different monitors are used by the agent during the interaction with the customer.

Furthermore, in accordance with some embodiments of the present disclosure, the computerized-method may further include sending a recording request to a screen-recording-service upon getting an interaction Computer Telephony Integration (CTI) event from an Automated Call Distribution (ACD) application when the interaction with the customer initiates.

Furthermore, in accordance with some embodiments of the present disclosure, the application is a contact-center application, and the collected time-metadata is interaction time-metadata.

Furthermore, in accordance with some embodiments of the present disclosure, the media-file may be retrieved from the data-storage based on the metadata of the-desktop activity that is stored in the metadata database.

Furthermore, in accordance with some embodiments of the present disclosure, the recording-segments may be in a predefined duration.

Furthermore, in accordance with some embodiments of the present disclosure, the recording-control service may further send the recording request to a voice-recoding-service. The voice-recording-service receives audio data stream from the desktop-screen-service that is running on each device that may be associated to the different monitors.

Furthermore, in accordance with some embodiments of the present disclosure, the recording request may be operated via Hypertext Transfer Protocol Secure (HTTPS).

Furthermore, in accordance with some embodiments of the present disclosure, the playback request for the media-file may be received via a UI that is associated to the application.

Furthermore, in accordance with some embodiments of the present disclosure, the stream of video data comprising video data of the plurality of screens of the different monitors in each time-interval.

Furthermore, in accordance with some embodiments of the present disclosure, the zoom-in module may include: in each time-interval of the media-file: (i) reading interaction time-metadata of current frame in the media-file; (ii) checking if there is a change in delta in the time-metadata between current frame in the media-file and previously read frame in the media-file; (iii) when there is a change in the delta in the time-metadata detecting the active-screen based on the interaction time-metadata; and (iv) when there is no change in the delta in the time-metadata detecting the active-screen based on entropy level in the frame.

Furthermore, in accordance with some embodiments of the present disclosure, the checking of change in delta in the time-metadata may be performed by comparing at least one of: (i) mouse-cursor position by x-axis and y-axis values and related active monitor position by pixel values; and (ii) active application position by x-axis and y-axis values.

Furthermore, in accordance with some embodiments of the present disclosure, the detecting of the active-screen based on the time-metadata may include: for each i-frame in the media-file: (i) comparing the mouse-cursor position and the related active monitor position; (ii) when the mouse-cursor position is similar to the related active monitor position, detecting the active-screen based on the active monitor position; (iii) when the mouse-cursor position is not similar to the related active monitor position, calculating an area of the active application and checking if the calculated area is larger than an area of one of the screens of the different monitors; (iv) when the calculated area of the active application is larger than the area of one of the screens of the different monitors, detecting the active-screen as the active monitor position; and (v) when the area of the active application is not larger than one of the screens of the different monitors, detecting the active-screen as the position of the mouse-cursor position.

Furthermore, in accordance with some embodiments of the present disclosure, the detecting of the active-screen based on entropy level may include for each i-frame in the media-file: (i) calculating entropy level in current i-frame. The i-frame comprising the plurality of screens of different monitors; (ii) when the calculated entropy level in current i-frame is different than calculated entropy level of previous i-frame, detecting the active-screen by the active monitor position within the previous i-frame and the current i-frame; (iii) when the calculated entropy level in current i-frame is similar to the entropy level of previous i-frame, detecting the active screen as the detected active monitor in previous i-frame. If the current i-frame is first i-frame, detecting the active-screen by the active monitor in the first i-frame.

Furthermore, in accordance with some embodiments of the present disclosure, the detecting of the active-screen by the active monitor position within the previous i-frame and the current i-frame may include: (i) calculating difference in entropy of each screen in the plurality of screens of different monitors between the previous i-frame and the current i-frame; (ii) detecting the active-screen as the screen in the plurality of screens that has highest calculated difference in entropy between the previous i-frame and the current i-frame.

Furthermore, in accordance with some embodiments of the present disclosure, the computerized-method may further include operating a sensitivity-check module to display frames of all the screens in the plurality of screens in the central section of the UI when the operation of the zoom-in module to detect the active-screen in the plurality of screens of the different monitors in the time-interval is not required. The sensitivity-check module may include: (i) calculating a sensitivity-score; (ii) comparing the calculated sensitivity-score to a sensitivity-threshold. When the calculated sensitivity-score is below the sensitivity-threshold, displaying the plurality of screens of the different monitors. When the calculated sensitivity-score is above the sensitivity-threshold displaying frames of the detected active-screen in the increased size in the central section of the UI, while frames of each screen of all other screens in the plurality of screens are displayed side by side in a reduced size in an upper section of the UI.

Furthermore, in accordance with some embodiments of the present disclosure, the sensitivity-score may be calculated according to formula I:

$$\text{sensitivity-score} = \text{abs}(\text{current } x,y - \text{last } x,y)/\text{period} \qquad (I)$$

whereby:

the current x, y, are the coordinates of the current active monitor, the last x, y are the coordinates of previously examined active monitor, and the period is a time-interval that the active monitor is examined.

Furthermore, in accordance with some embodiments of the present disclosure, the calculating of entropy level may be performed by a pretrained images Artificial Intelligence (AI) model. The pretrained images AI model may be continuously trained to calculate the entropy level in the i-frame based on an image pixel distribution and the i-frames in the media-file.

BRIEF DESCRIPTION OF THE DRAWINGS

FIGS. 2A-2B are a high-level workflow of a computerized-method for detecting an active-screen in a plurality of screens of different monitors in a media-file of a recorded desktop activity, during playback of the media-file, in accordance with some embodiments of the present disclosure;

DETAILED DESCRIPTION

Figure 1A:
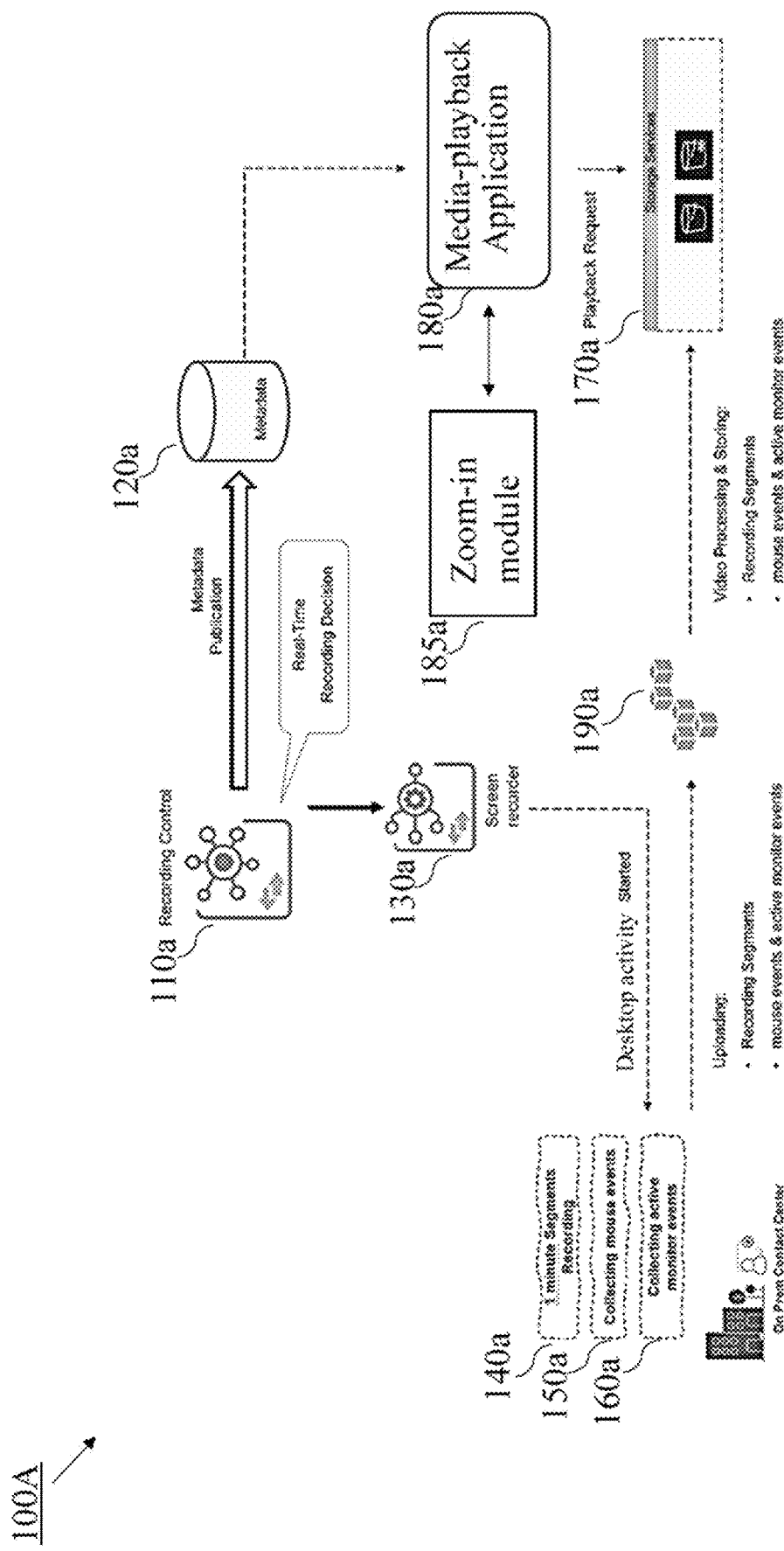
FIGS. 1A-1C schematically illustrate a high-level diagram of a system for detecting an active-screen in a plurality of screens of different monitors in a media-file of a recorded desktop activity, during playback of the media-file, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Current technical solutions display a plurality of screens of different monitors in a media-file of a recorded desktop activity, during playback of the media-file, side by side. However, in each time there is only one screen that is active and requires the attention of the user that is playing the media-file.

There is a need for a technical solution that will automatically detect the active-screen in the desktop activity in the media-file during the playback of the media-file.

Accordingly, there is a need for a technical solution for detecting an active-screen in a plurality of screens of different monitors in a media-file of a recorded desktop activity from an application, during playback of the media-file.

The term "monitor", as used herein refers to a device that has a screen that shows pictures and words. The monitor is connected to a computerized-device as a source of input.

The term "media-playback application" as used herein, refers to an application software for playing multimedia computer files such as video files. The media-playback application may also play audio files.

FIG. 1A schematically illustrates a high-level diagram of a system 100A for detecting an active-screen in a plurality of screens of different monitors in a media-file of a recorded desktop activity, during playback of the media-file, in accordance with some embodiments of the present disclosure.

Figure 2A:
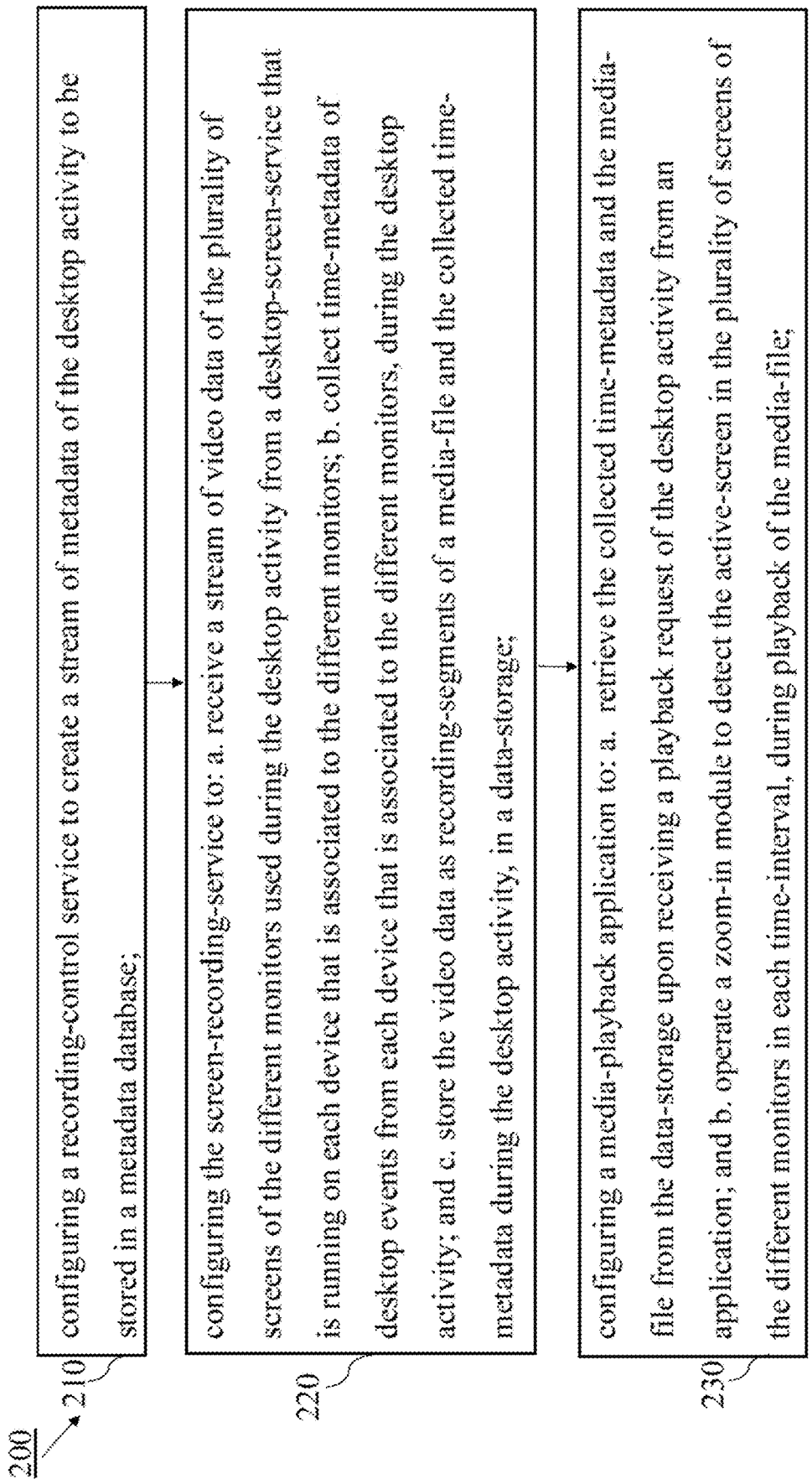

According to some embodiments of the present disclosure, in a system, such as system 100A for detecting an active-screen in a plurality of screens of different monitors in a media-file of a recorded desktop activity, during playback of the media-file, a computerized-method, such as computerized method 200 in FIGS. 2A-2B for detecting an active-screen in a plurality of screens of different monitors in a media-file of a recorded desktop activity, during playback of the media-file may be implemented. The active-screen may be the screen of a monitor in the plurality of screens of different monitors, that there was a movement in two-dimensional X-Y plane therein during a series of frames in the media-file of a recorded desktop activity. The recorded desktop activity may be for example, agent's activity via multiple applications, carried via different computerized-devices each associated to a monitor, during an interaction with a customer.

According to some embodiments of the present disclosure, a recording-control service 110a may be configured to create a stream of metadata of the desktop activity to be stored in a metadata database 120a.

According to some embodiments of the present disclosure, when the desktop activity from an application may start, a screen-recording-service may be configured to receive a stream of video data, e.g., Real-time Transport Protocol (RTP) video data stream, of the plurality of screens of the different monitors used during the desktop activity from a desktop-screen-service that is running on each computerized-device that is associated to the different monitors. The desktop-screen-service may collect mouse events 150a and active monitor events 160a. The desktop activity may be of one or more applications which has been operated via the different monitors, for example, during an interaction of an agent with a customer. The stream of video data includes video data of the plurality of screens of the different monitors in each time-interval.

According to some embodiments of the present disclosure, time-metadata of desktop events from each computerized-device that is associated to the different monitors, may be collected during the desktop activity, and the video data may be stored as recording-segments 140a of a media-file, in a data-storage 190a. The collected time-metadata during the desktop activity may be stored in a metadata database 120a and may include recording_times: recording start time, recording end time, in float format and the duration in seconds, total_resolution: in float format, i.e., the total resolution monitors as a sum of all the monitor a list of two values: x sum value, i.e., sum of all x resolution monitors, y sum value i.e., sum of all y resolution monitors, active monitor with x, y coordinates in float format, detection_time, i.e., the time in second for each x, y value. Active application with x, y coordinates in float format, detection_time, i.e., the time in second for each x, y value. Mouse location with x, y coordinates in float format, detection_time i.e., the time in second for each x, y value.

According to some embodiments of the present disclosure, the recording-segments 140a of the media-file may be in a predefined duration.

According to some embodiments of the present disclosure, the collected interaction time-metadata may include at least one of: (i) mouse-cursor position by x-axis and y-axis values and related active monitor position by pixel values; and (ii) active application position by x-axis and y-axis values.

According to some embodiments of the present disclosure, a media-playback application 180a may be configured to retrieve the collected time-metadata and the media-file from the data-storage 190*a* upon receiving a playback request of the desktop activity from an application (not shown), and to operate a zoom-in module 185*a* to detect the active-screen in the plurality of screens of the different monitors in each time-interval, during playback of the media-file. The recording request may be operated via Hypertext Transfer Protocol Secure (HTTPS).

According to some embodiments of the present disclosure, mouse delta refers to the change in position of the mouse cursor between two consecutive frames and it is commonly measured in pixels and represents the distance that the user has moved the mouse curser since last update. The active monitor location delta may be measured by comparing the values of the x, y coordinates.

According to some embodiments of the present disclosure, the zoom-in module may include, in each time-interval of the media-file: (i) reading interaction time-metadata of current frame in the media-file; (ii) checking if there is a change in delta in the time-metadata between current frame in the media-file and previously read frame in the media-file; (iii) when there is a change in the delta in the time-metadata detecting the active-screen based on the time-metadata; and (iv) when there is no change in the delta in the time-metadata detecting the active-screen based on entropy level in the frame.

According to some embodiments of the present disclosure, the checking of change in delta in the time-metadata may be performed by comparing at least one of: (i) mouse-cursor position by x-axis and y-axis values and related active monitor position by pixel values; and (ii) active application position by x-axis and y-axis values vs. the related active monitor position by pixel values. The comparison is a measurement of the total pixels values over the area of the total pixels, if there are change between them then there is a change.

According to some embodiments of the present disclosure, the detecting of the active-screen based on the time-metadata may include: for each i-frame in the media-file: (i) comparing the mouse-cursor position and the related active monitor position; (ii) when the mouse-cursor position is similar to the related active monitor position, detecting the active-screen based on the active monitor position; (iii) when the mouse-cursor position is not similar to the related active monitor position, calculating an area of the active application and checking if the calculated area is larger than an area of one of the screens of the different monitors; (iv) when the calculated area of the active application is larger than the area of one of the screens of the different monitors, detecting the active-screen as the active monitor position; and (v) when the area of the active application is not larger than one of the screens of the different monitors, detecting the active-screen as the position of the mouse-cursor position. The area is larger in absolute values.

According to some embodiments of the present disclosure, the area of the active-application may be calculated based on the time metadata in the time-interval of the active-application, by using the x, y location a rectangle may be built.

According to some embodiments of the present disclosure, the detecting of the active-screen may be based on the time metadata when there is metadata such as mouse events, monitor events and active application. However, when there is contrast metadata, such as the action monitor location doesn't match the active application location then the active-screen may be detected based on the entropy level. The entropy level of an image is a measure of its complexity or information content. It quantifies the richness of information within the image or how unpredictable the pixel values are within the image.

According to some embodiments of the present disclosure, the detecting of the active-screen based on entropy level may include for each i-frame in the media-file: (i) calculating entropy level in current i-frame. (ii) when the calculated entropy level in current i-frame is different than calculated entropy level of previous i-frame, detecting the active-screen by the active monitor position within the previous i-frame and the current i-frame; and (iii) when the calculated entropy level in current i-frame is similar to the entropy level of previous i-frame, detecting the active screen as the detected active monitor in previous i-frame.

According to some embodiments of the present disclosure, if the current i-frame is the first i-frame in the video stream data, detecting the active-screen by the active monitor in the first i-frame. Each i-frame includes the plurality of screens of different monitors.

According to some embodiments of the present disclosure, the calculating of entropy level may be performed by a pretrained images Artificial Intelligence (AI) model, and the pretrained images AI model may be continuously trained to calculate the entropy level in the i-frame based on an image pixel distribution and the i-frames in the media-file. The AI model may be continuously trained based on user feedback and may be finetuned accordingly. During the training the image pixel feature distribution that provides the entropy level may be tracked to learn how it changes over different examples. The entropy level may be the sum of pixels value feature normalized by three for Red, Green and Blue (RGB) color image and then divided by the monitor resolution.

According to some embodiments of the present disclosure, the detecting of the active-screen by the active monitor position within the previous i-frame and the current i-frame may include: (i) calculating difference in entropy of each screen in the plurality of screens of different monitors between the previous i-frame and the current i-frame; and (ii) detecting the active-screen as the screen in the plurality of screens that has highest calculated difference in entropy between the previous i-frame and the current i-frame.

According to some embodiments of the present disclosure, optionally, changes may be examined also in the frames between the i-frames, e.g., b-frames and p-frames, per x second as configured.

According to some embodiments of the present disclosure, optionally, a sensitivity-check module, such as sensitivity check 330 and 335 in FIG. 3, may be operated to determine the necessity of the zoom-in module. When there is no active-screen to zoom-in, meaning there is minor change or a change below a preconfigured threshold that is not significant enough to display a screen as active-screen in an increased size in a central position all the screens may be displayed side by side in the monitors view.

According to some embodiments of the present disclosure, the playback request for the media-file may be received via a UI that is associated to the media-playback application 180*a*.

According to some embodiments of the present disclosure, the application that is related to the desktop activity may be a contact-center application and the collected time-metadata may be an interaction time-metadata.

According to some embodiments of the present disclosure, the media-file may be retrieved from the data-storage 190*a* based on the metadata of the-desktop activity that is stored in the metadata database 120*a*.

According to some embodiments of the present disclosure, the operation of system 100A may enable a user to track the desktop activity e.g., active-screen, by configuring a User Interface (UI) that is associated to a media-playback application 180a to zoom-in the detected active-screen and magnify it by display the detected active-screen in each time-interval in an increased size in a central section of the UI, while each screen of all other screens in the plurality of screens may be displayed side by side in a reduced size in an upper section of the UI, during the playback of the media-file.

According to some embodiments of the present disclosure, the active-screen, may be a screen of the monitor that had the most desktop activity when the desktop activity has been recorded. The active-screen may be displayed in a central position in the UI, thus eliminating the need to manually switch the view between monitors during playback of the media-file.

According to some embodiments of the present disclosure, system 100A may detect the active-screen in each time-interval in the playback of the media-file, by analyzing information in each i-frame in the video stream of the media-file and identifying the screen of the monitor during which the desktop activity has occurred.

According to some embodiments of the present disclosure, instead of displaying all the screens of the different monitors side by side, the identified active-screen may be displayed in a monitor playback view and the other screens may be displayed side by side in the title bar during the playback of the media-file.

According to some embodiments of the present disclosure, system 100A may be implemented as a feature of the media-playback application 180a, that when enabled provides an auto screen focus and when disabled all screens of the different monitors are displayed side by side during playback of the media-file.

Figure 1B:
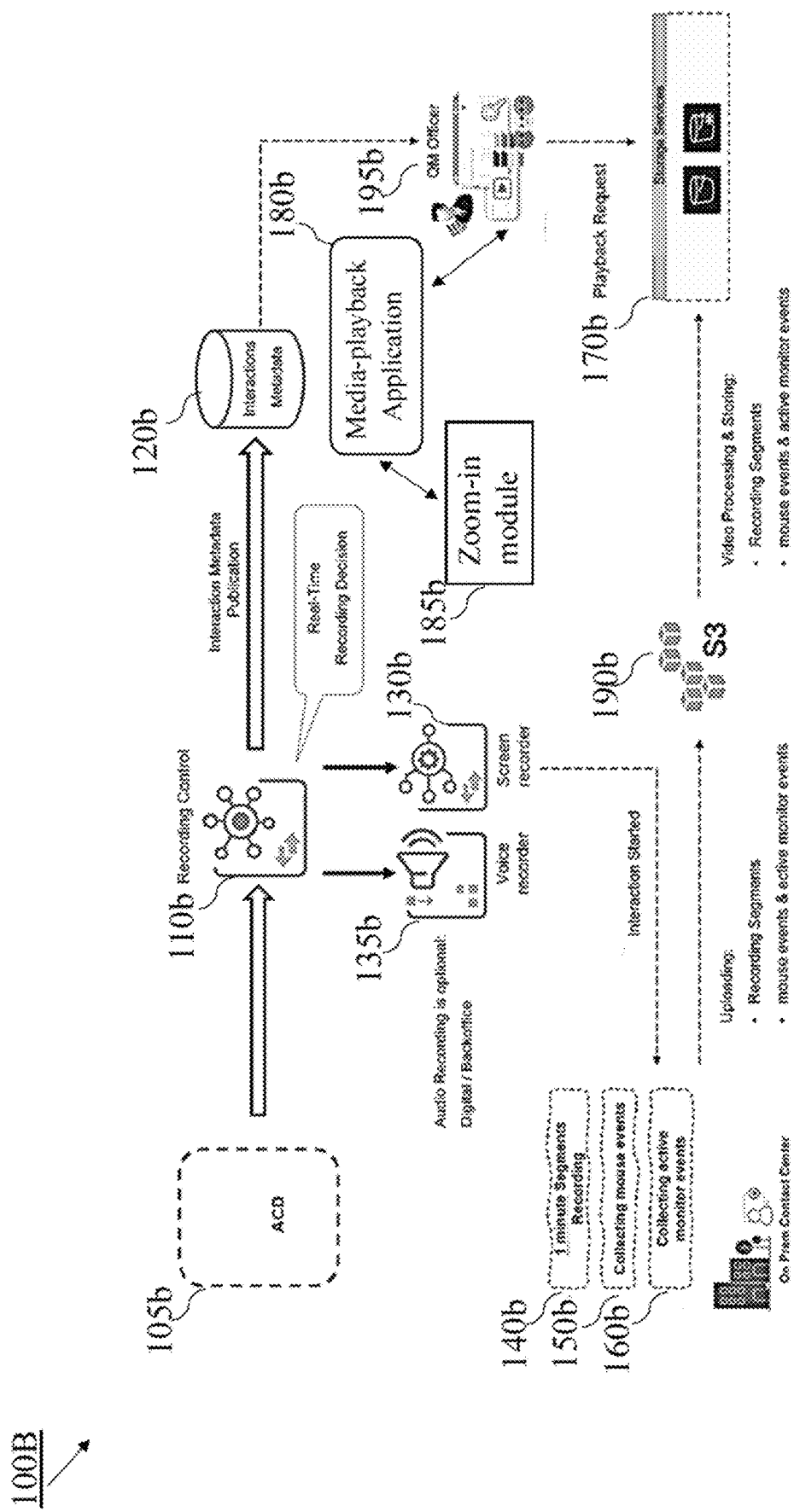

FIG. 1B schematically illustrates a high-level diagram of a system 100B for detecting an active-screen in a plurality of screens of different monitors in a media-file of a recorded desktop activity, during playback of the media-file, in accordance with some embodiments of the present disclosure.

According to some embodiments of the present disclosure, system 100B may include the components of system 100A in FIG. 1A.

According to some embodiments of the present disclosure, an Automated Call Distribution (ACD) application 105b may be integrated with a Computer Telephony Integration (CTI) system to enhance call routing capabilities. The ACD application 105b may operate an ACD media service to collect desktop activity, from the different monitors, for example, during an interaction of an agent with a customer. The desktop activity may be collected by sending CTI event to a recording-control service 110b, such as recording-control service 110a in FIG. 1A, when an interaction with a customer initiates. Upon getting the CTI event from the ACD 105b application a recording request may be sent by the recording-control service 110b to a screen-recording-service 130b, such as screen-recording-service 130a in FIG. 1A. The screen-recording-service 130b may be set up to record the desktop activity of the agent and to capture how the agent uses applications, navigating databases, filling out forms and the like, to resolve a customer query during the interaction, which may be later on used for training and quality assurance purposes by playback of the media-file with the recorded desktop activity of the agent.

According to some embodiments of the present disclosure, the recording-control service 110b may further send the recording request to a voice-recording-service. The voice-recording-service may receive audio data stream from the desktop-screen-service that is running on each computerized-device that is associated to the different monitors.

According to some embodiments of the present disclosure, the recording may be of desktop activity from one or more applications during the interaction with the customer. Different monitors may be used by the agent during the interaction with the customer to operate the applications.

According to some embodiments of the present disclosure, the recording-control service 110b may get the CTI event and create a video stream with relevant metadata regarding the interaction. The metadata may include information related to the interaction such as when it started, who did it on which computerized-devices, and the like. In addition, the recording-control service 110b may send a recording request i.e., media request to the relevant media type. The media type may be for example the voice-recording-service 135b and the screen-recording-service 130b.

According to some embodiments of the present disclosure, the voice-recording-service 135b may start to receive Real-time Transport Protocol (RTP) audio data stream from the ACD media services of the ACD application 105b.

According to some embodiments of the present disclosure, the media request has been also sent to the screen-recording-service 130b to receive video data. The recorded interaction may be uploaded as recording segments of a preconfigured during. For example, 1-minute segments recording 140b in a digital multimedia container format most commonly used to store video and audio, such as MP4.

According to some embodiments of the present disclosure, time metadata of the desktop event, e.g., desktop activity, may be collected on the agent desktop during the interaction. For example, mouse events 150b and active monitor events 160b. The mouse events may include mouse location: x, y. The active monitor events 160b may include active monitor location: x, y. For example, the screen monitor may have the values of x=[0,1980], y=[0,800] corresponding to monitor of 1980×800 resolution. Next screen monitor may be, x2=[1980,3960], y2=[800,1600] corresponding to second monitor of 1980×800 resolution. If the mouse courser metadata was x=[1000, 1250], y=[200, 250] it means that the mouse was on first monitor and the selected metadata of the selected monitor is: x=[0,1980], y=[0,800]. The x, y coordinates may be in pixel values. The metadata of desktop event may also include the active Application location: x, y coordinates.

According to some embodiments of the present disclosure, the collected screen recording information which includes video data, and the time metadata may be uploaded to a data-storage 190b, such as data-storage 190a. The data-storage 190b may be sent via secured Hypertext Transfer Protocol Secure (HTTPs) request to an object storage service in the cloud computing environment, for example Simple Storage Service (S3) bucket of Amazon® cloud computing services.

According to some embodiments of the present disclosure, all the aggregated information and the recording data may be processed and uploaded to the data-storage 190b.

According to some embodiments of the present disclosure, metadata of the interaction of the agent with the customer may be pushed to the interactions metadata database 120b, such as metadata database 120a in FIG. 1A.

According to some embodiments of the present disclosure, the media-playback application 180b, upon receiving a playback request of the media-file with the recorded desktop activity from an application, such as Quality Management (QM) application 195*b*, the media-playback application 180*b* may retrieve the collected time-metadata and the media-file from the data-storage 190*b* by the data-storage service 170*b*.

According to some embodiments of the present disclosure, the media-playback application 180*b* may operate a module, such as zoom-in module 185*b* to detect the active-screen in the plurality of screens of the different monitors in each time-interval, during playback of the media-file.

According to some embodiments of the present disclosure, a User Interface (UI) that is associated to the media-playback application 180*b* may be configured to display the detected active-screen in each time-interval in an increased size in a central section of the UI, e.g., monitors playback view, while each screen of all other screens in the plurality of screens is displayed side by side in a reduced size in an upper section of the UI, e.g., title bar, during the playback of the media-file.

According to some embodiments of the present disclosure, thus, each time-interval, the entire video data including all the recorded activity, e.g., full image including all the screens of the different monitors, from all the different monitors may be displayed.

Figure 1C:
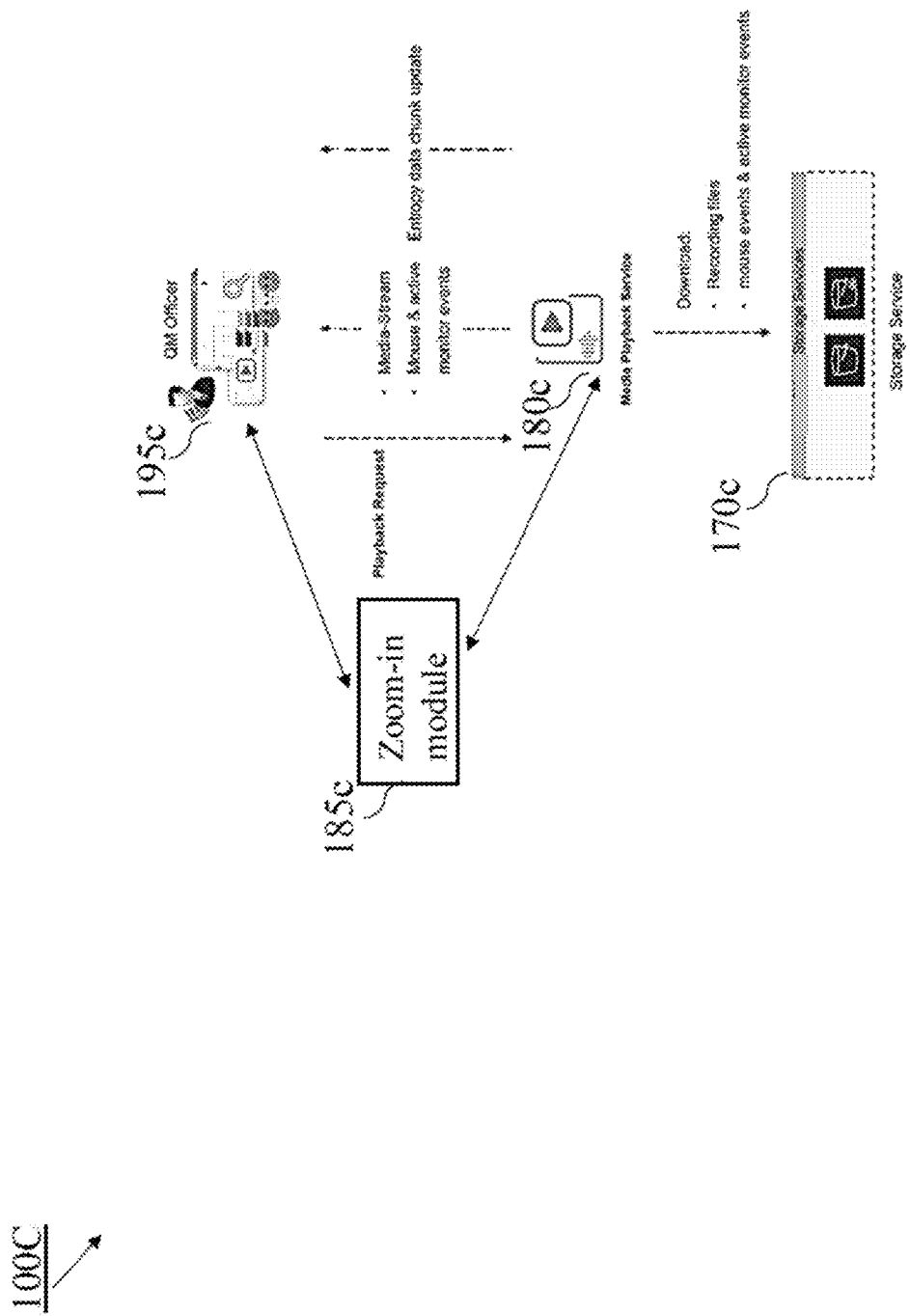

FIG. 1C schematically illustrates a high-level diagram of a system 100C for displaying a detected active-screen in a plurality of screens of different monitors in a media-file of a recorded desktop activity, during playback of the media-file, in accordance with some embodiments of the present disclosure.

According to some embodiments of the present disclosure, an application, such as Quality Management (QM) application 195*c*, and such as QM application 195*b* in FIG. 1B may receive a selection of an interaction for evaluation via an associate UI and may send a playback request for the interaction to a media-playback service, such as media-playback application 180*a* in FIG. 1A.

According to some embodiments of the present disclosure, the media-playback service 180*c* may download metadata and the media data from the data-storage 170*c* which may be retrieved from a data-storage, such as data-storage 190*b* in FIG. 1B.

According to some embodiments of the present disclosure, the media-playback service 180*c* may send to the QM application 195*c*, the media stream of the media-file of the interaction, the time metadata and may operate the zoom-in module 185*c*, such as zoom-in module 185*b* in FIG. 1B, and such as zoom-in module 185*a* in FIG. 1A, to detect the active-screen in the plurality of screens of the different monitors in each time-interval, during playback of the media-file.

According to some embodiments of the present disclosure, a UI that may be associated to the media-playback application 180*c* to display the detected active-screen in each time-interval in an increased size in a central section of the UI, e.g., zoom-in, while each screen of all other screens in the plurality of screens is displayed side by side in a reduced size in an upper section of the UI, during the playback of the media-file.

According to some embodiments of the present disclosure, media data and time metadata may be used to send the relevant monitor location according to the x, y coordination or when there is a mismatch or if there is no relevant metadata the active-screen may be detected based on the entropy logic versus previous time-interval and then displayed in zoom-in via the UI.

According to some embodiments of the present disclosure, additional data structure, e.g., JavaScript Object Notation (JSON) format, may be created and sent back to the media-playback application 180*c*. The media-playback application 180*c* may use the JSON data structure to allow the UI to zoom according to the coordinates in the time metadata. The JSON format may represent the structured data based on JavaScript object syntax. The created data structure may include the X, Y coordinates which indicate the distance, in pixels values, between the upper left corner of the monitor and the current location of the cursor.

FIGS. 2A-2B are a high-level workflow of a computerized-method 200 for detecting an active-screen in a plurality of screens of different monitors in a media-file of a recorded desktop activity, during playback of the media-file, in accordance with some embodiments of the present disclosure.

According to some embodiments of the present disclosure, operation 210 comprising configuring a recording-control service to create a stream of metadata of the desktop activity to be stored in a metadata database.

According to some embodiments of the present disclosure, operation 220 comprising configuring the screen-recording-service to: a. receive a stream of video data of the plurality of screens of the different monitors used during the desktop activity from a desktop-screen-service that is running on each device that is associated to the different monitors; b. collect time-metadata of desktop events from each device that is associated to the different monitors, during the desktop activity; and c. store the video data as recording-segments of a media-file and the collected time-metadata during the desktop activity, in a data-storage.

According to some embodiments of the present disclosure, operation 230 comprising configuring a media-playback application to: a. retrieve the collected time-metadata and the media-file from the data-storage upon receiving a playback request of the desktop activity from an application; and b. operate a zoom-in module to detect the active-screen in the plurality of screens of the different monitors in each time-interval, during playback of the media-file.

According to some embodiments of the present disclosure, operation 240 comprising configuring a User Interface (UI) that is associated to the media-playback application to display the detected active-screen in each time-interval in an increased size in a central section of the UI, while each screen of all other screens in the plurality of screens is displayed side by side in a reduced size in an upper section of the UI, during the playback of the media-file.

Figure 3A:
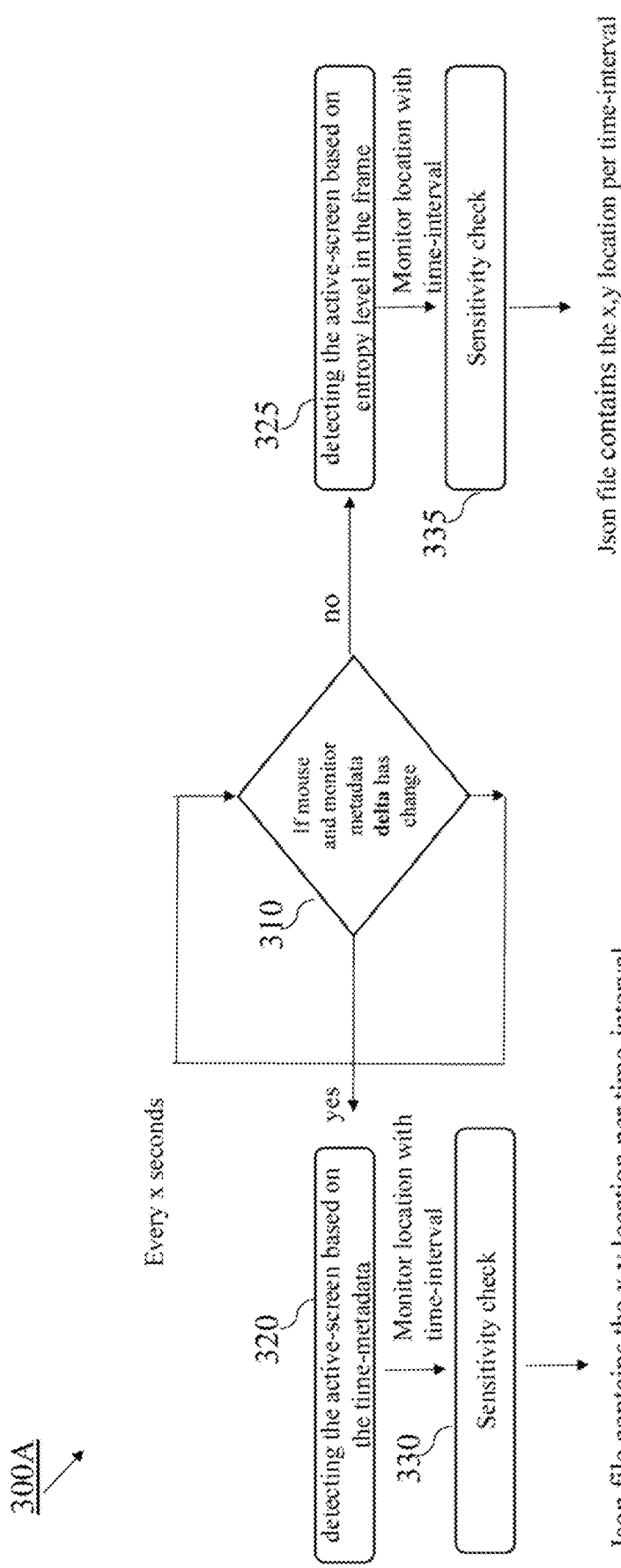
FIGS. 3A-3B are a high-level workflow of a computerized-method for detecting an active-screen in a plurality of screens of different monitors in a media-file of a recorded desktop activity, during playback of the media-file, in accordance with some embodiments of the present disclosure.
Figure 3B:
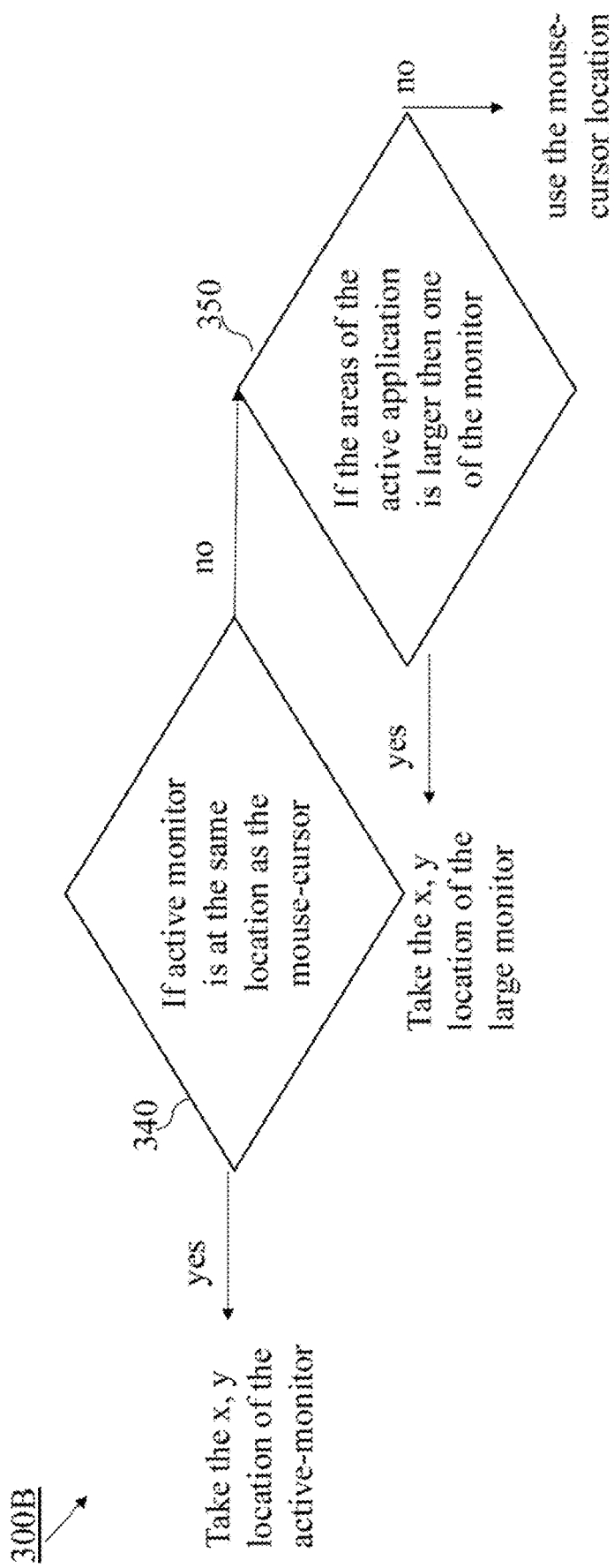

FIGS. 3A-3B are a high-level workflow of a computerized-method 300 for detecting an active-screen in a plurality of screens of different monitors in a media-file of a recorded desktop activity, during playback of the media-file, in accordance with some embodiments of the present disclosure.

According to some embodiments of the present disclosure, in a system, such as system 100A in FIG. 1A and such as system 100B in FIG. 1B, during playback of the media-file, each time-interval, e.g., every x seconds reading a frame, e.g., i-frame, from the media-file of a recorded desktop activity, checking if mouse and monitor metadata data has changed 310. The desktop activity may be user's operation of multiple applications, carried via different computerized-devices, each associated to a monitor, during an interaction with a customer.

Figure 4A:
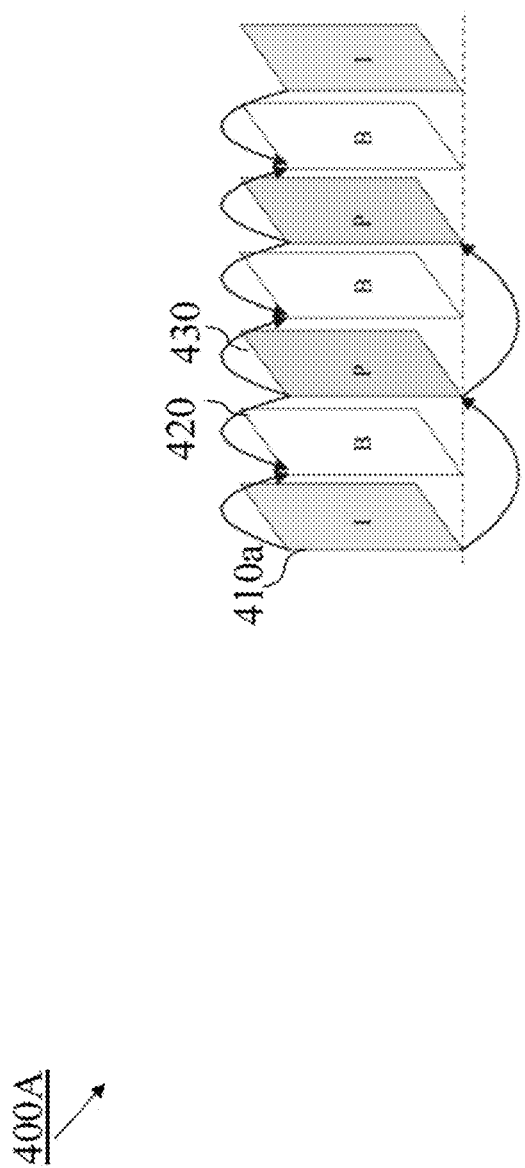
FIGS. 4A-4E are screenshots of active-screen detection in a plurality of screens of different monitors in a media-file of a recorded desktop activity, during playback of the media-file, based on entropy, in accordance with some embodiments of the present disclosure.

According to some embodiments of the present disclosure, the media-file, i.e., the screen recording may be built such that every preconfigured time, e.g., 200 milliseconds, there is a frame, as shown in FIG. 4A, and every period of time there is a full information frame such as I-frame.

According to some embodiments of the present disclosure, for each frame per time-interval and time-metadata the input may be mouse-cursor location_x, mouse-cursor location_y, active_monitor_x, active_monitor_y, active_applicationr_x, and active_application_y. The location may be indicated as a float number.

According to some embodiments of the present disclosure, the checking if mouse and monitor metadata data has changed 310 may be operated by running a Euclidean distance matric for each value in the input and calculating the difference. The Euclidean distance between two points in Euclidean space is the length of the line segment between them. It can be calculated from the Cartesian coordinates of the points using the Pythagorean theorem, and therefore may be referred to as the Pythagorean distance. Other methods, such as the square of the Euclidean distance, that leaves positive numbers unchanged and replace negative numbers by the absolute value, may be used to check if there was a change.

According to some embodiments of the present disclosure, the distance between any two points on the real line is the absolute value of the numerical difference of their coordinates, which is their absolute difference. Thus, if p and q are two points on the real line, then the distance between them may be:

$$d(p,q)=|p-q|, \text{ or}$$

$$d(p, q) = \sqrt[2]{(p - q)^2}$$

According to some embodiments of the present disclosure, when there is no change in the mouse and monitor metadata data, e.g., the Euclidean distance matric the difference may be '0' and the active-screen may be detected by entropy level in the frame.

According to some embodiments of the present disclosure, when there is a change in the mouse and monitor metadata data, then the active-screen in the i-frame may be automatically detected based on metadata of the desktop activity 320 that has been maintained during the monitored desktop activity. When there is not enough mouse and monitor metadata data, the active-screen may be automatically detected based on the change to the entropy 325 of each screen in the i-frame to the next i-frame.

According to some embodiments of the present disclosure, optionally, after the automated detection of the active-screen from the plurality of screens from the different monitors, a sensitivity check may be operated 330 or 335.

According to some embodiments of the present disclosure, the sensitivity check may be performed by operating a sensitivity-check module. The sensitivity check may be operated to display frames of all the screens in the plurality of screens in the central section of the UI, when the operation of the zoom-in module 185a to detect the active-screen in the plurality of screens of the different monitors in the time-interval is not required.

According to some embodiments of the present disclosure, the sensitivity-check module may calculate a sensitivity-score and then compare the calculated sensitivity-score to a sensitivity-threshold. When the calculated sensitivity-score is below the sensitivity-threshold, the plurality of screens of the different monitors, may be displayed. For example, when the sensitivity score is 5 per period of 1 second, that mean that when there is more than 5 pixels changes over 1 sec the change it too fast to use and it will be disregarded.

According to some embodiments of the present disclosure, when the calculated sensitivity-score is above the sensitivity-threshold, the detected active-screen may be displayed in the increased size in the central section of the UI, while each screen of all other screens in the plurality of screens may be displayed side by side in a reduced size in an upper section of the UI.

According to some embodiments of the present disclosure, the sensitivity-score may be calculated according to formula I:

$$\text{sensitivity-score}=\text{abs}(\text{current } x,y-\text{last } x,y)/\text{period} \quad (I)$$

whereby:
the current x, y, are the coordinates of the current active monitor,
    the last x, y are the coordinates of previously examined active monitor, and
    the period is a time-interval that the active monitor is examined.

According to some embodiments of the present disclosure, the media-playback application 180a may receive a structured data, e.g., in JavaScript Object Notation (JSON) format that contains the x, y location of the active monitor and mouse-cursor. The JSON structured data may include time-interval, e.g., start time and end time and the area, e.g., x, y location. For example, 0.5 sec, 0:1080, 0:1920.

According to some embodiments of the present disclosure, checking if the active monitor is at the same location as the mouse-cursor 340, and when the active monitor is at the same location as the mouse-cursor, then the x, y, location of the monitor may be selected to be the detected active-screen. The active monitor may be taken from the metadata of the desktop activity.

According to some embodiments of the present disclosure, when the active monitor is not at the same location as the mouse-cursor, then, checking if the area of active application is larger than the area of one of the screens of the different monitors 350. When the area of the active application is larger than the area of one of the screens of the different monitors, detecting the active-screen as the active monitor position. When the area of the active application is not larger than the area of one of the screens of the different monitors, detecting the active-screen as the mouse-curser location.

According to some embodiments of the present disclosure, the output of the comparisons, such as 310 and 340-350 may be a Boolean value of yes or no.

Figure 5A:
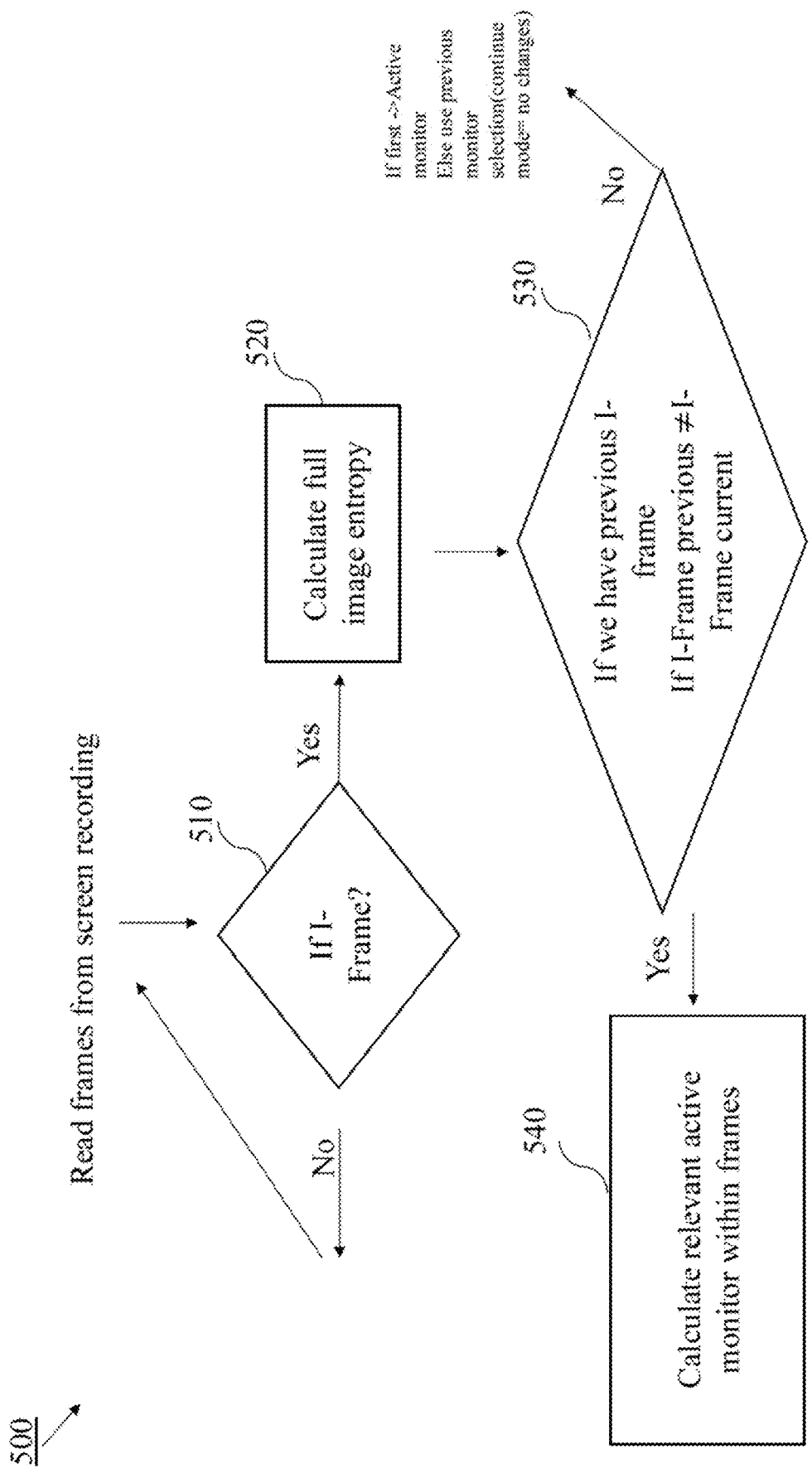
FIGS. 5A-5B are a high-level workflow of active-screen detection in a plurality of screens of different monitors in a media-file of a recorded desktop activity, during playback of the media-file, based on entropy, in accordance with some embodiments of the present disclosure.
Figure 5B:
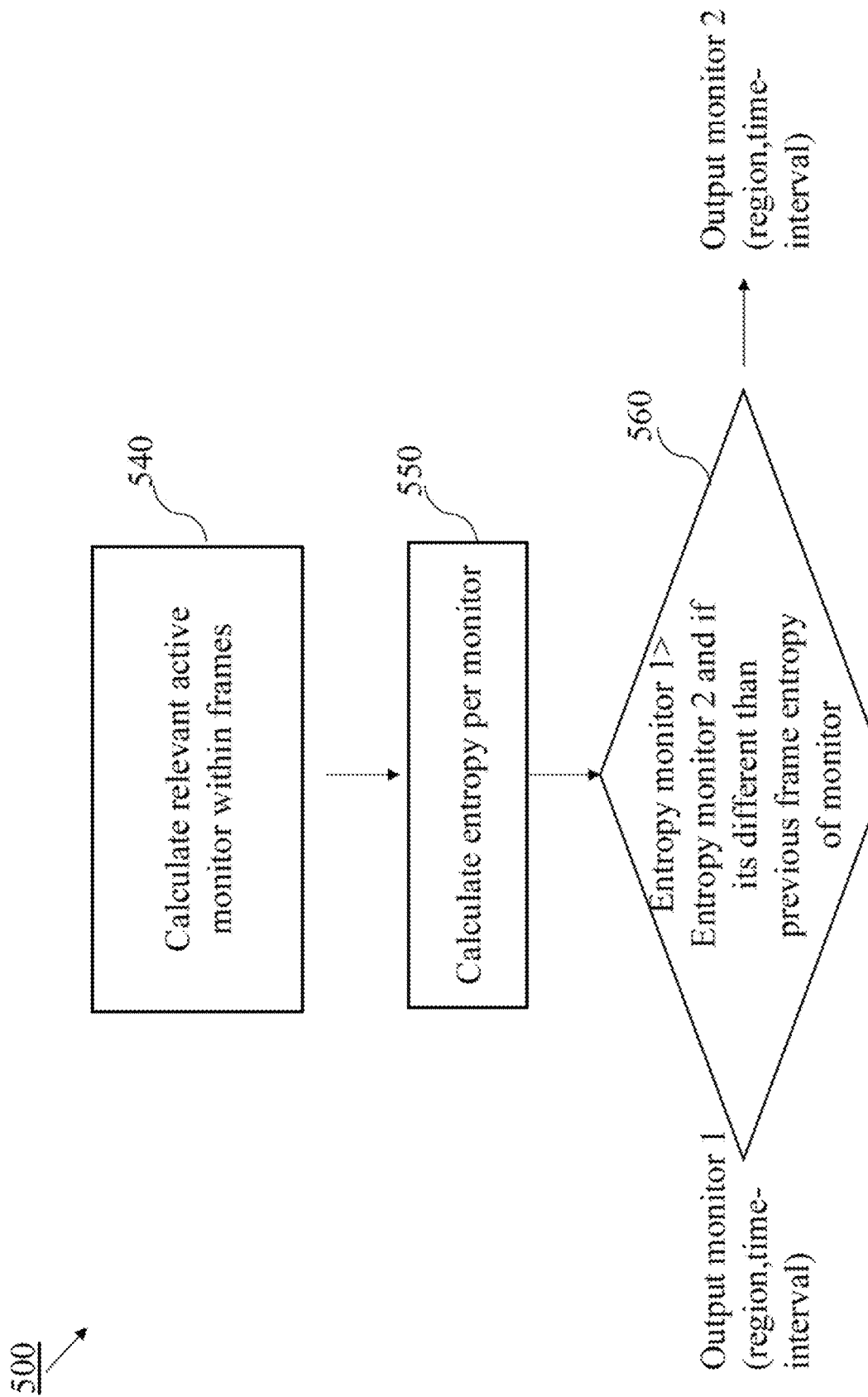

According to some embodiments of the present disclosure, the active-screen may be automatically detected based on the change to the entropy 325 of each screen in the i-frame to the next i-frame. For example, as shown in FIGS. 5A-5B.

According to some embodiments of the present disclosure, entropy measures an image's information content used in image processing. A high entropy number denotes a complex image with a wide range of pixel values, whereas a low entropy value denotes a more straightforward, uniform image. for example, as shown in example 600A in FIG. 6A.

According to some embodiments of the present disclosure, the entropy level if each i-frame may be compared to previous i-frame. When there is a change in the entropy level, the frame may be divided to portions where each portion is the corresponding monitor. The entropy level may be calculated to each portion, e.g., each monitor. The active-screen may be detected as the screen in the plurality of screens that has highest calculated difference in entropy between the previous i-frame and the current i-frame. For example, as shown in FIG. 6B and FIGS. 4B-4E.

According to some embodiments of the present disclosure, test results for 410 frame samples per 5 Frame per Samples the precision was approximately 72% and the accuracy 76%.

FIG. 4A is an example 400A of a stream of frames in video data, in accordance with some embodiments of the present disclosure.

According to some embodiments of the present disclosure, the I-Frame, such as I-Frame 410a, represents intra frames that contain a complete picture, i.e., the total data for decoding, and therefore they are independent from P-frames and B-frames for the decoding process. B-Frame 420 represents bi predictive frames, which require I-frame and P-frame during the decoding process. The P-Frame 430 represents predictive frames, which require an I-frame during decoding process.

Figure 4B:
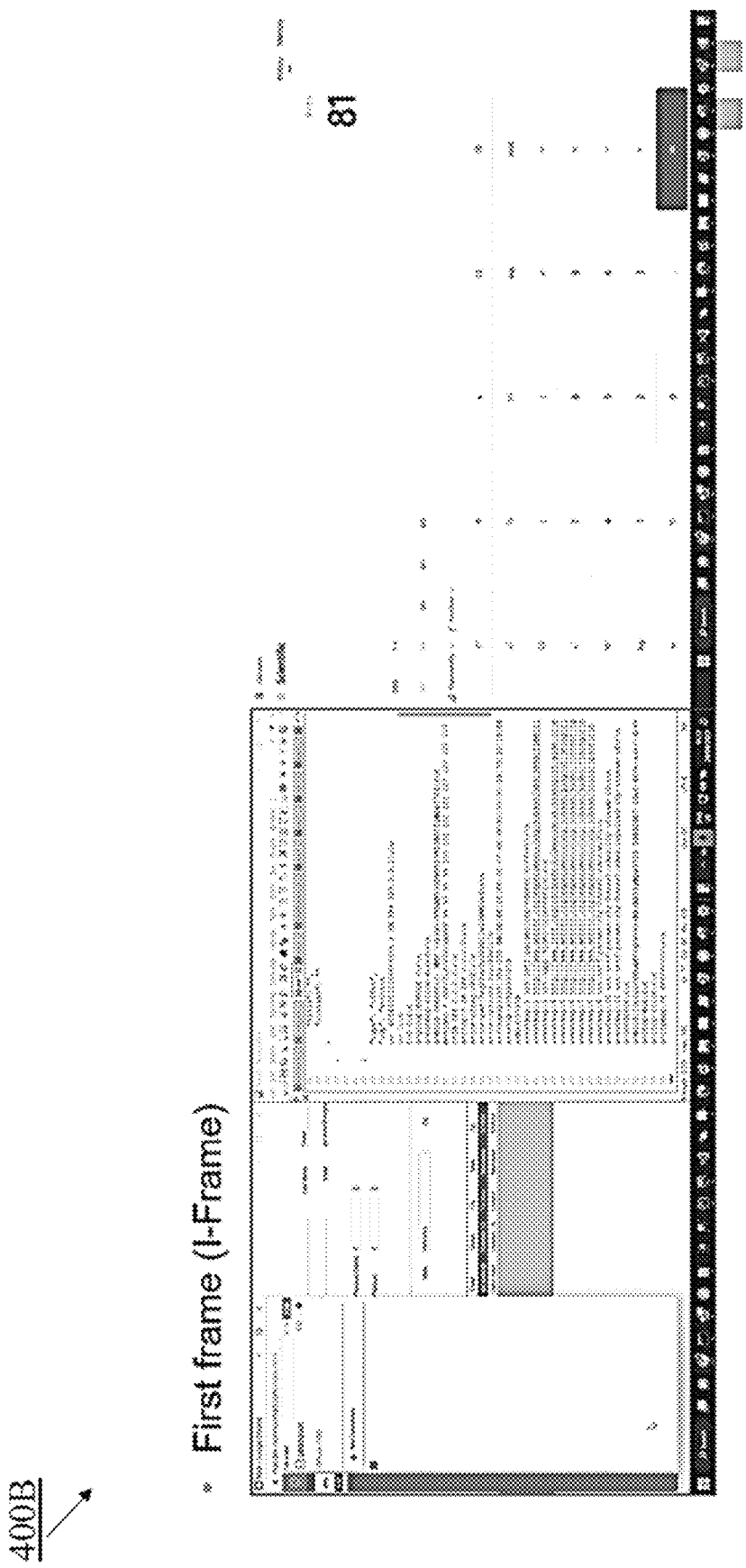

FIG. 4B is a screenshot 400B of an I-Frame displaying two screens of different monitors, in a media-file of a recorded desktop activity, during playback of the media-file, in accordance with some embodiments of the present disclosure. The total frame entropy is approximately 10.

Figure 4C:
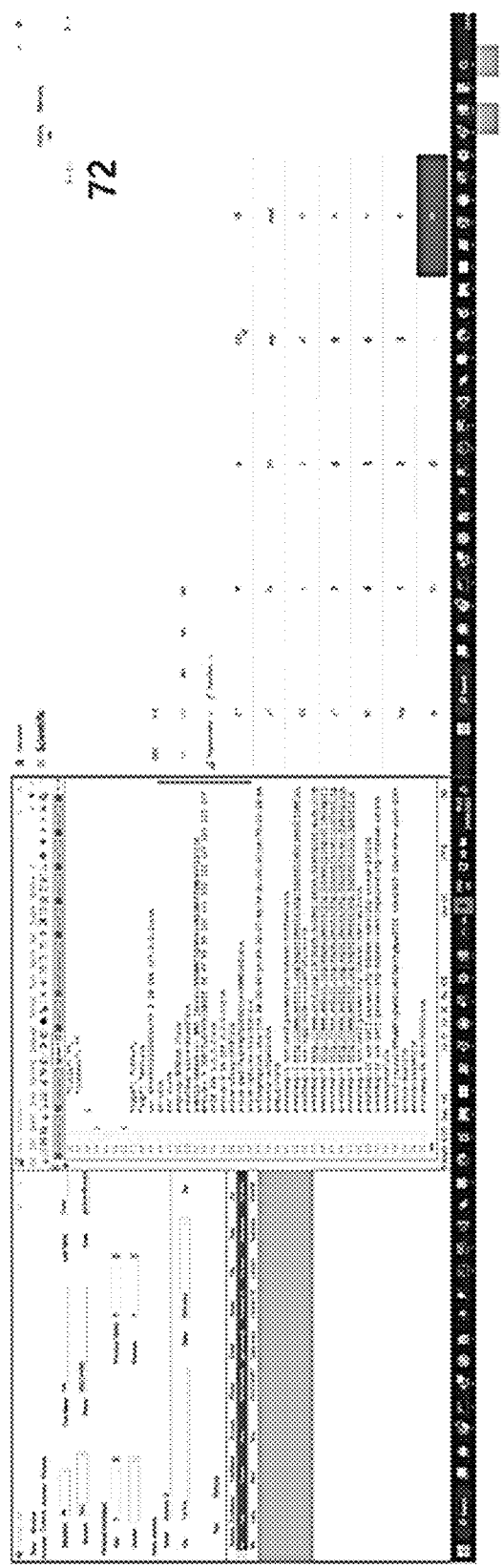

FIG. 4C is a screenshot 400C of an I-Frame after I-Frame 400B that is displaying two screens of different monitors, in a media-file of a recorded desktop activity, during playback of the media-file, in accordance with some embodiments of the present disclosure. The total frame entropy is approximately 8.5.

Figure 4D:
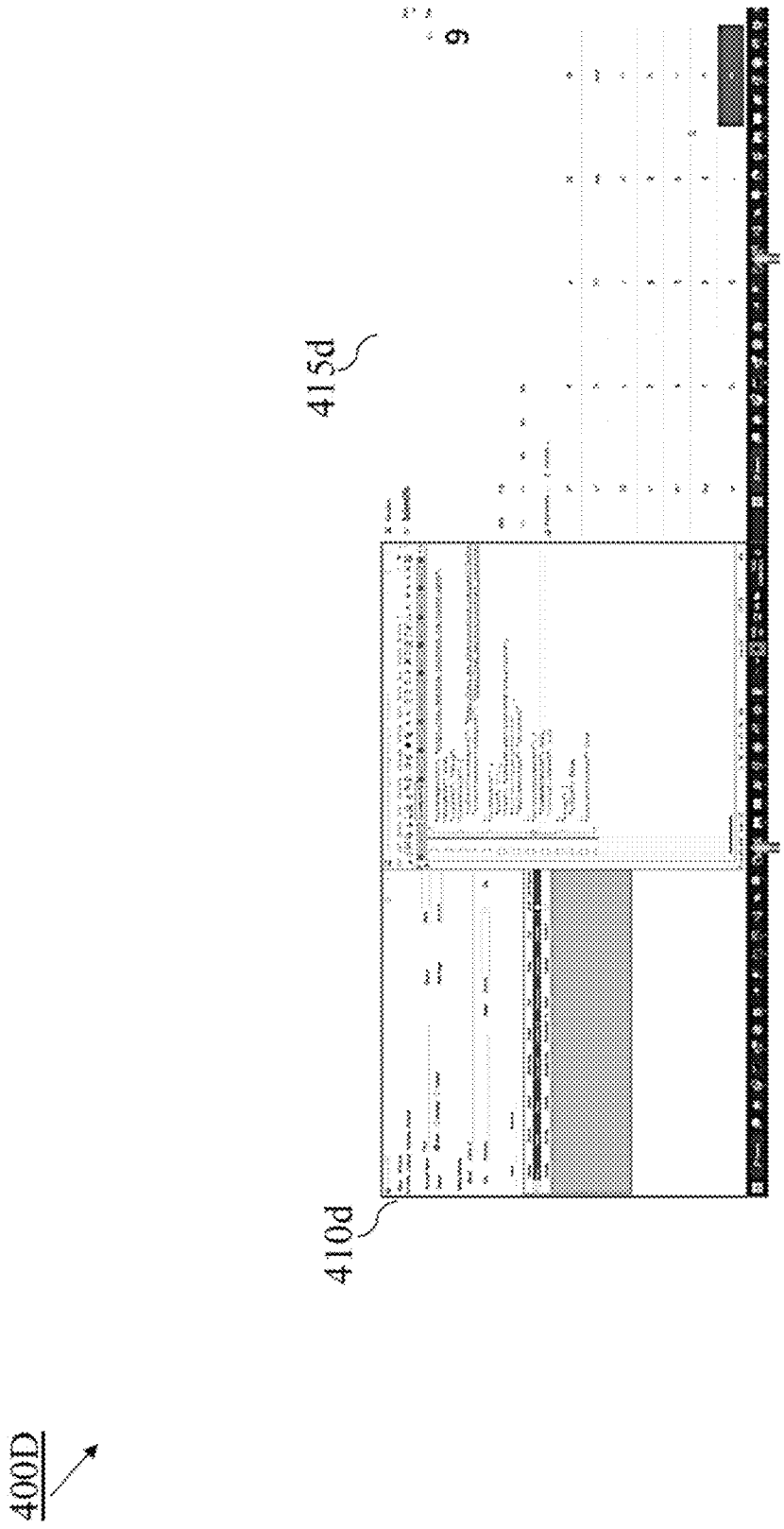

FIG. 4D is a screenshot 400D of an I-Frame that is displaying two screens 410d and 415d of different monitors, during playback of the media-file, in accordance with some embodiments of the present disclosure.

According to some embodiments of the present disclosure, the entropy level in the left screen 410d is approximately 6.8 and the entropy level in the right screen is approximately 4.2.

Figure 4E:
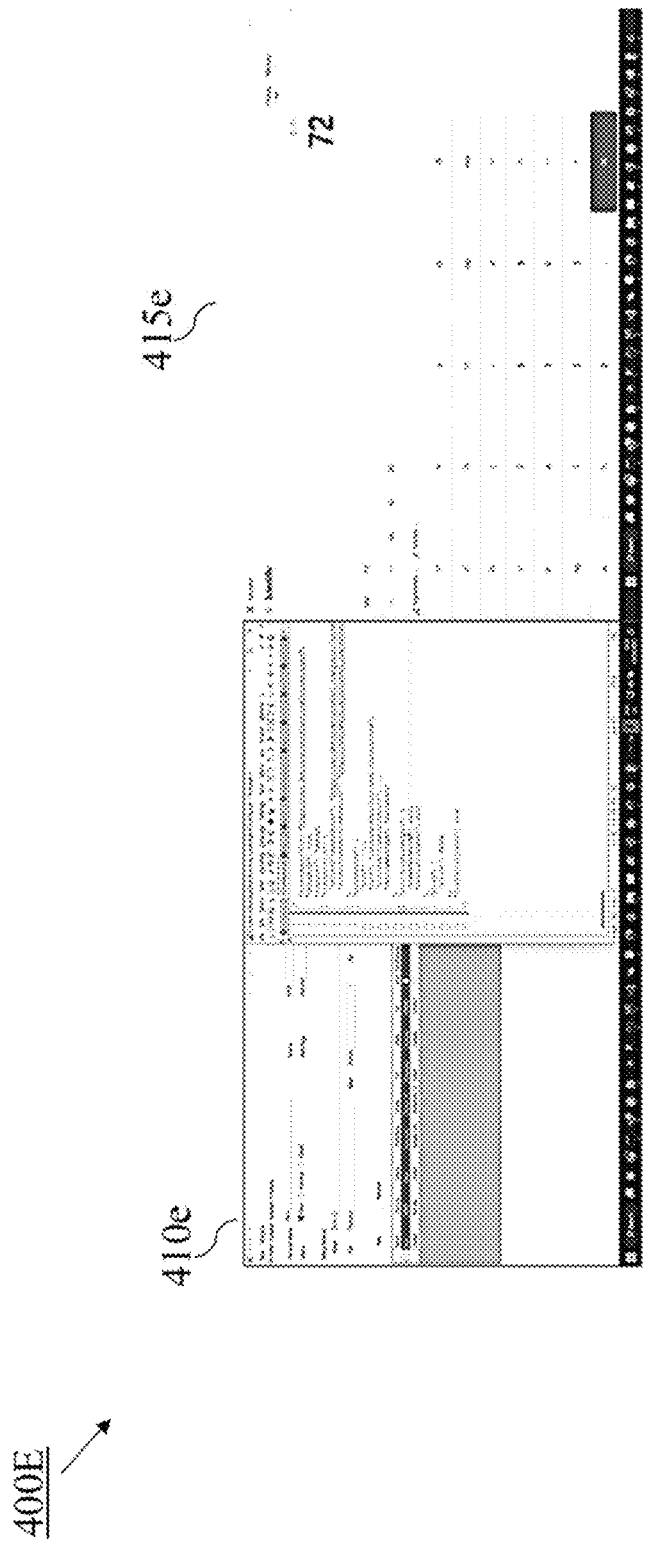

FIG. 4E is a screenshot 400E of an I-Frame that is after I-Frame 400D in the video stream of frames. Screenshot 400E is displaying two screens 410e and 415e of different monitors, during playback of the media-file, in accordance with some embodiments of the present disclosure.

According to some embodiments of the present disclosure, the entropy level in the left screen 410d is approximately 6.9 and the entropy level in the right screen is approximately 4.7.

According to some embodiments of the present disclosure, the calculating of entropy level is performed by a pretrained images Artificial Intelligence (AI) model, and the pretrained images AI model may be continuously trained to calculate the entropy level in the i-frame based on an image pixel distribution and the i-frames in the media-file.

According to some embodiments of the present disclosure, the entropy level is a statistical measure of randomness that can be used to characterize the texture of an image. Entropy is defined as-sum (p.*log 2(p)), where p contains the normalized histogram counts returned from imhist function in Matlab®, which calculates the histogram for grayscale or indexed images.

Figure 6A:
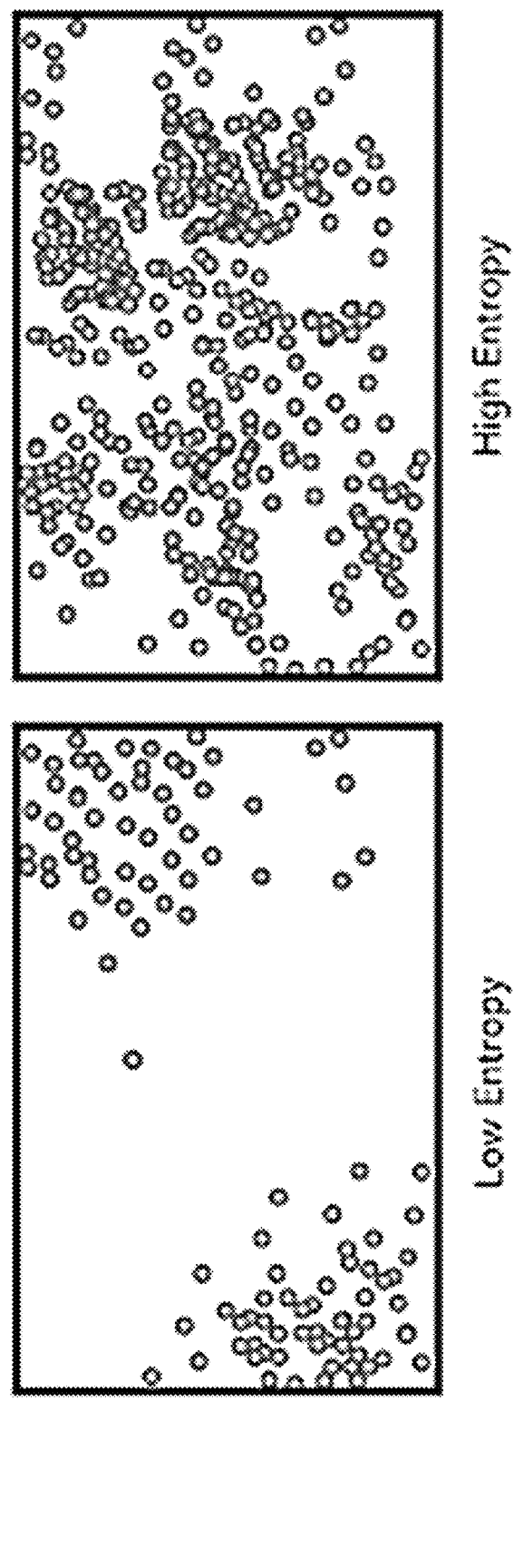
FIGS. 6A-6B show examples of entropy level, in accordance with some embodiments of the present disclosure.

According to some embodiments of the present disclosure, as shown for example in in FIG. 6A, the entropy is a measure of uncertainty or randomness in an image. The global entropy of the image, as shown in FIGS. 4B and 4C may be mathematically defined as the following formula:

$$H = -\sum_{i=0}^{255} p_i \log_2 p_i$$

whereby:

$p_i$ is the probability that has been obtained from the normalized histogram of the image, associated with the gray-level i. In a similar manner, the local entropy may be defined to define local image complexity and may be computed from the local histogram of the image, a specific portion of the global image, which is the frame per second value.

According to some embodiments of the present disclosure, an i-frame may be divided into the screens of the different monitors based on the metadata, e.g., 410d and 415d in FIG. 4D and then for each portion of the i-frame that includes a screen of a monitor, the local entropy may be calculated. For example, the local entropy of screen 410d is approximately 6.8 and the local entropy of screen 415d is approximately 4.2.

According to some embodiments of the present disclosure, when there is a change in entropy level between a screen in an i-frame and the screen in the next i-frame, for example, the entropy level of screen 415d in FIG. 4D is approximately 4.2 and in the next i-frame the local entropy level is 4.7, as shown in 415e, which is +0.5 change in the entropy in previous screen 415d and also the difference of +0.5 is higher than the difference between the entropy level of screen 410d in FIG. 4D which is approximately 6.8 and in the next i-frame the local entropy level is 6.9 as shown in 410c, which is almost similar to the entropy in the screen in previous i-frame.

According to some embodiments of the present disclosure, the i-frames may be compared at time t versus the at time t+1.

FIGS. 5A-5B are a high-level workflow 500 of active-screen detection in a plurality of screens of different monitors in a media-file of a recorded desktop activity, during playback of the media-file, based on entropy, in accordance with some embodiments of the present disclosure.

According to some embodiments of the present disclosure, during playback of a media-file, reading stream of frames, as shown in FIG. 4A, and checking if it is an i-frame 510. When the frame is an i-frame, calculating full image entropy 520. If the entropy level of previous i-frame is different than the entropy level of current i-frame 530, then calculating the portion of relevant active monitor within the previous i-frame and current i-frame 540.

According to some embodiments of the present disclosure, if the entropy level of previous i-frame is similar to the entropy level of current i-frame 530, then if the i-frame is the first i-frame the detected active-screen is the active monitor otherwise it may be the active-monitor in previous i-frame.

According to some embodiments of the present disclosure, the entropy level may be calculated per monitor in the previous i-frame and the current i-frame 550. Then, for example, when there are two monitors, the entropy level of monitor 1 in previous i-frame may be compared to the entropy level of monitor 1 in current i-frame, and the entropy level of monitor 2 in previous i-frame may be compared to the entropy level of monitor 2 in current i-frame. If the entropy level of monitor 1 is higher than the entropy level of entropy level of monitor 2 in current i-frame and the difference in entropy level of monitor 2 between previous i-frame and current i-frame is larger than the difference between entropy level of monitor 1 in previous i-frame and current i-frame 560 then the detected active-screen may be monitor 2. otherwise, it may be monitor 1. For example, when entropy monitor >1 entropy monitor 2 and if it's different than previous frame entropy of monitor, the output is the region in x, y coordinates and the relevant time allocated to it.

Figure 6B:
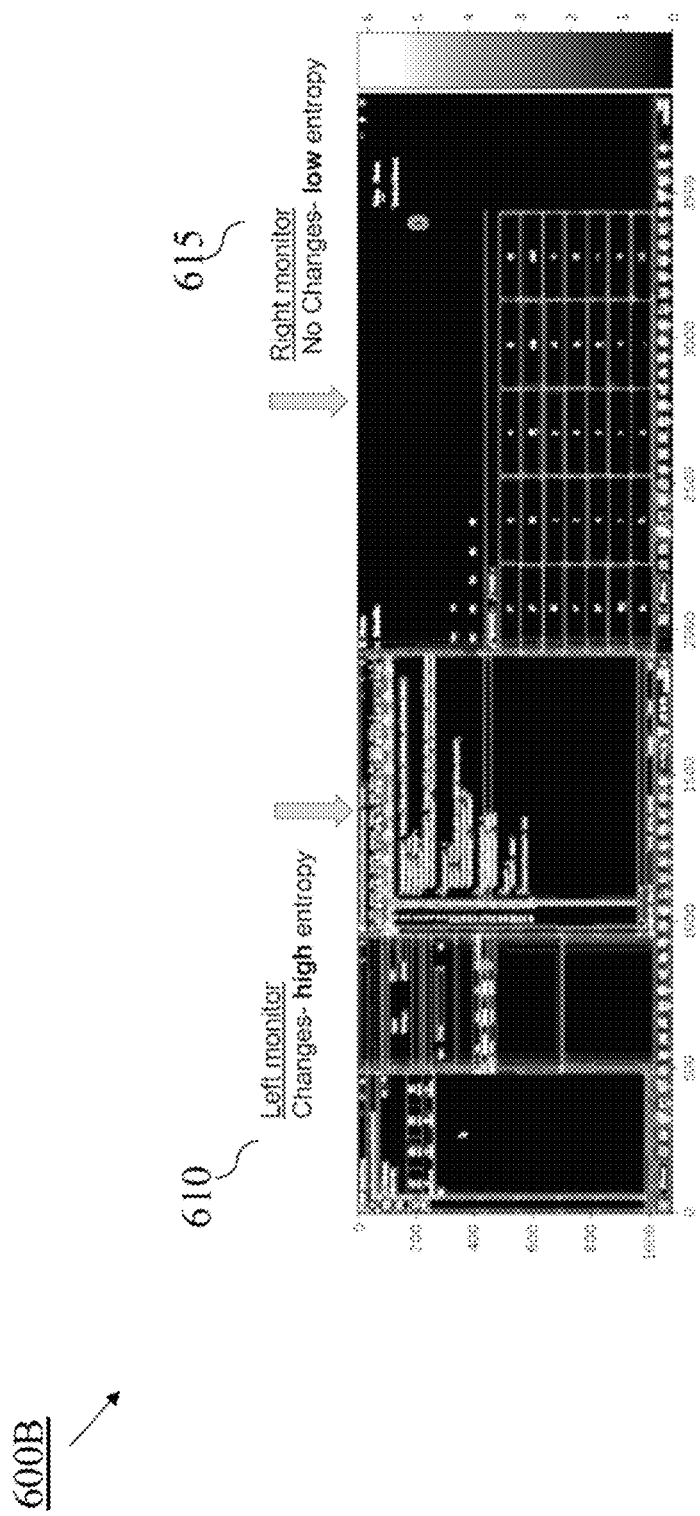

FIG. 6B shows an example 600B of an i-frame that is divided into two screens of two different monitors, in accordance with some embodiments of the present disclosure.

Figure 7:
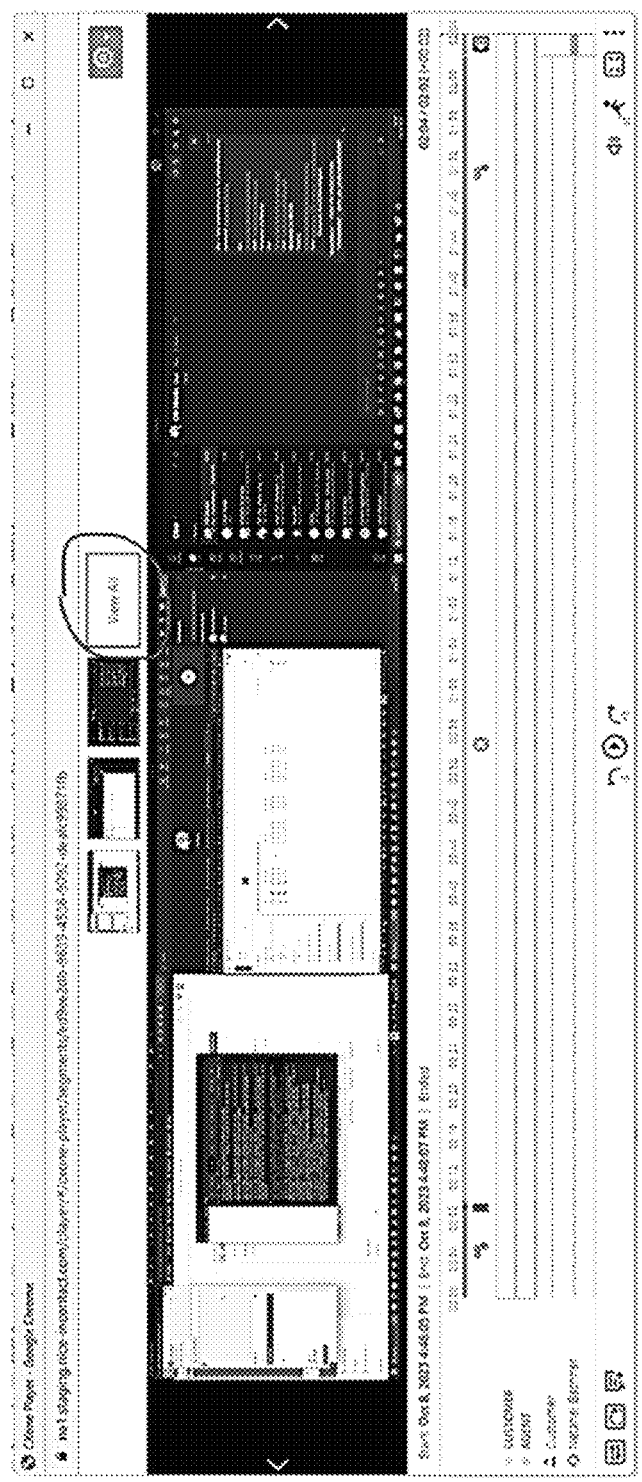
FIG. 7 is an example of screenshot of a User Interface (UI) to display multiply screens of desktop activity, in accordance with some embodiments of the present disclosure.

According to some embodiments of the present disclosure, the screen of the left monitor 610 has high entropy and the right monitor 615 has low entropy. For example, as shown in FIGS. 4D-4E FIG. 7 is an example of screenshot of a User Interface (UI) 700 to display multiply screens of desktop activity, in accordance with some embodiments of the present disclosure.

According to some embodiments of the present disclosure, UI 700 may be an example of a UI of an application, such as application 180a in FIG. 1A to display all the screens of different monitors during playback of a media-file of a recorded desktop activity.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for detecting an active-screen in a plurality of screens of different monitors in a media-file of a recorded desktop activity, during playback of the media-file, said computerized-method comprising:

(i) configuring a recording-control service to create a stream of metadata of the desktop activity to be stored in a metadata database;
(ii) configuring a screen-recording-service to:
   a. receive a stream of video data of the plurality of screens of the different monitors used during the desktop activity from a desktop-screen-service that is running on each device that is associated to the different monitors;
   b. collect time-metadata of desktop events from each device that is associated to the different monitors, during the desktop activity; and
   c. store the video data as recording-segments of a media-file and the collected time-metadata during the desktop activity, in a data-storage;
(iii) configuring a media-playback application to:
   a. retrieve the collected time-metadata and the media-file from the data-storage upon receiving a playback request of the desktop activity from an application; and
   b. operate a zoom-in module to detect the active-screen in the plurality of screens of the different monitors in each time-interval, during playback of the media-file; and
(iv) configuring a User Interface (UI) that is associated to the media-playback application to display the detected active-screen in each time-interval in an increased size in a central section of the UI, while each screen of all other screens in the plurality of screens is displayed side by side in a reduced size in an upper section of the UI, during the playback of the media-file.

2. The computerized-method of claim 1, wherein said collected interaction time-metadata includes at least one of: (i) mouse-cursor position by x-axis and y-axis values and related active monitor position by pixel values; and (ii) active application position by x-axis and y-axis values.

3. The computerized-method of claim 1, wherein said desktop activity is an activity of an agent during an interaction with a customer,
   wherein the different monitors are used by the agent during the interaction with the customer, and
   wherein the computerized-method further comprising sending a recording request to a screen-recording-service upon getting an interaction Computer Telephony Integration (CTI) event from an Automated Call Distribution (ACD) application when the interaction with the customer initiates.

4. The computerized-method of claim 1, wherein the application is a contact-center application, and wherein the collected time-metadata is interaction time-metadata and the media-file is retrieved from the data-storage based on the metadata of the-desktop activity that is stored in the metadata database.

5. The computerized-method of claim 1, wherein the recording-segments are in a predefined duration.

6. The computerized-method of claim 1, wherein the recording-control service further sends the recording request to a voice-recoding-service, said voice-recording-service receives audio data stream from the desktop-screen-service that is running on each device that is associated to the different monitors.

7. The computerized-method of claim 1, wherein the recording request is operated via Hypertext Transfer Protocol Secure (HTTPS).

8. The computerized-method of claim 1, wherein the playback request for the media-file is received via a UI that is associated to the application.

9. The computerized-method of claim 1, wherein the stream of video data comprising video data of the plurality of screens of the different monitors in each time-interval.

10. The computerized-method of claim 1, said zoom-in module comprising:
in each time-interval of the media-file:
(i) reading interaction time-metadata of current frame in the media-file;
(ii) checking if there is a change in delta in the time-metadata between current frame in the media-file and previously read frame in the media-file;
(iii) when there is a change in the delta in the time-metadata detecting the active-screen based on the time-metadata; and
(iv) when there is no change in the delta in the time-metadata detecting the active-screen based on entropy level in the frame.

11. The computerized-method of claim 10, wherein the checking of change in delta in the time-metadata is performed by comparing at least one of: (i) mouse-cursor position by x-axis and y-axis values and related active monitor position by pixel values; and (ii) active application position by x-axis and y-axis values.

12. The computerized-method of claim 10, wherein the detecting of the active-screen based on
the time-metadata comprising:
for each i-frame in the media-file:
(i) comparing the mouse-cursor position and the related active monitor position;
(ii) when the mouse-cursor position is similar to the related active monitor position, detecting the active-screen based on the active monitor position;
(iii) when the mouse-cursor position is not similar to the related active monitor position, calculating an area of the active application and checking if the calculated area is larger than an area of one of the screens of the different monitors;
(iv) when the calculated area of the active application is larger than one of the area of one of the screens of the different monitors, detecting the active-screen as the active monitor position; and
(v) when the area of the active application is not larger than one of the screens of the different monitors, detecting the active-screen as the position of the mouse-cursor position.

13. The computerized-method of claim 10, wherein the detecting of the active-screen based on entropy level comprising:
for each i-frame in the media-file:
(i) calculating entropy level in current i-frame, wherein said i-frame comprising the plurality of screens of different monitors;
(ii) when the calculated entropy level in current i-frame is different than calculated entropy level of previous i-frame, detecting the active-screen by the active monitor position within the previous i-frame and the current i-frame; and
(iii) when the calculated entropy level in current i-frame is similar to the entropy level of previous i-frame, detecting the active screen as the detected active monitor in previous i-frame,
wherein if the current i-frame is first i-frame, detecting the active-screen by the active monitor in the first i-frame.

14. The computerized-method of claim 13, wherein the detecting of the active-screen by the active monitor position within the previous i-frame and the current i-frame comprising:
(i) calculating difference in entropy of each screen in the plurality of screens of different monitors between the previous i-frame and the current i-frame; and
(ii) detecting the active-screen as the screen in the plurality of screens that has highest calculated difference in entropy between the previous i-frame and the current i-frame.

15. The computerized-method of claim 1, wherein the computerized-method further comprising operating a sensitivity-check module to display frames of all the screens in the plurality of screens in the central section of the UI when the operation of the zoom-in module to detect the active-screen in the plurality of screens of the different monitors in the time-interval is not required, said sensitivity-check module comprising:
(i) calculating a sensitivity-score; and
(ii) comparing the calculated sensitivity-score to a sensitivity-threshold,
wherein, when the calculated sensitivity-score is below the sensitivity-threshold, displaying the plurality of screens of the different monitors,
wherein when the calculated sensitivity-score is above the sensitivity-threshold displaying frames of the detected active-screen in the increased size in the central section of the UI, while frames of each screen of all other screens in the plurality of screens are displayed side by side in a reduced size in an upper section of the UI, and wherein said sensitivity-score is calculated according to formula I:

$$\text{sensitivity-score} = \text{abs}(\text{current } x,y - \text{last } x,y)/\text{period} \quad (I)$$

whereby:
the current x, y, are the coordinates of the current active monitor,
the last x, y are the coordinates of previously examined active monitor, and
the period is a time-interval that the active monitor is examined.

16. The computerized-method of claim 13, wherein the calculating of entropy level is performed by a pretrained images Artificial Intelligence (AI) model, and
wherein the pretrained images AI model is continuously trained to calculate the entropy level in the i-frame based on an image pixel distribution and the i-frames in the media-file.

* * * * *